Patented Sept. 15, 1931

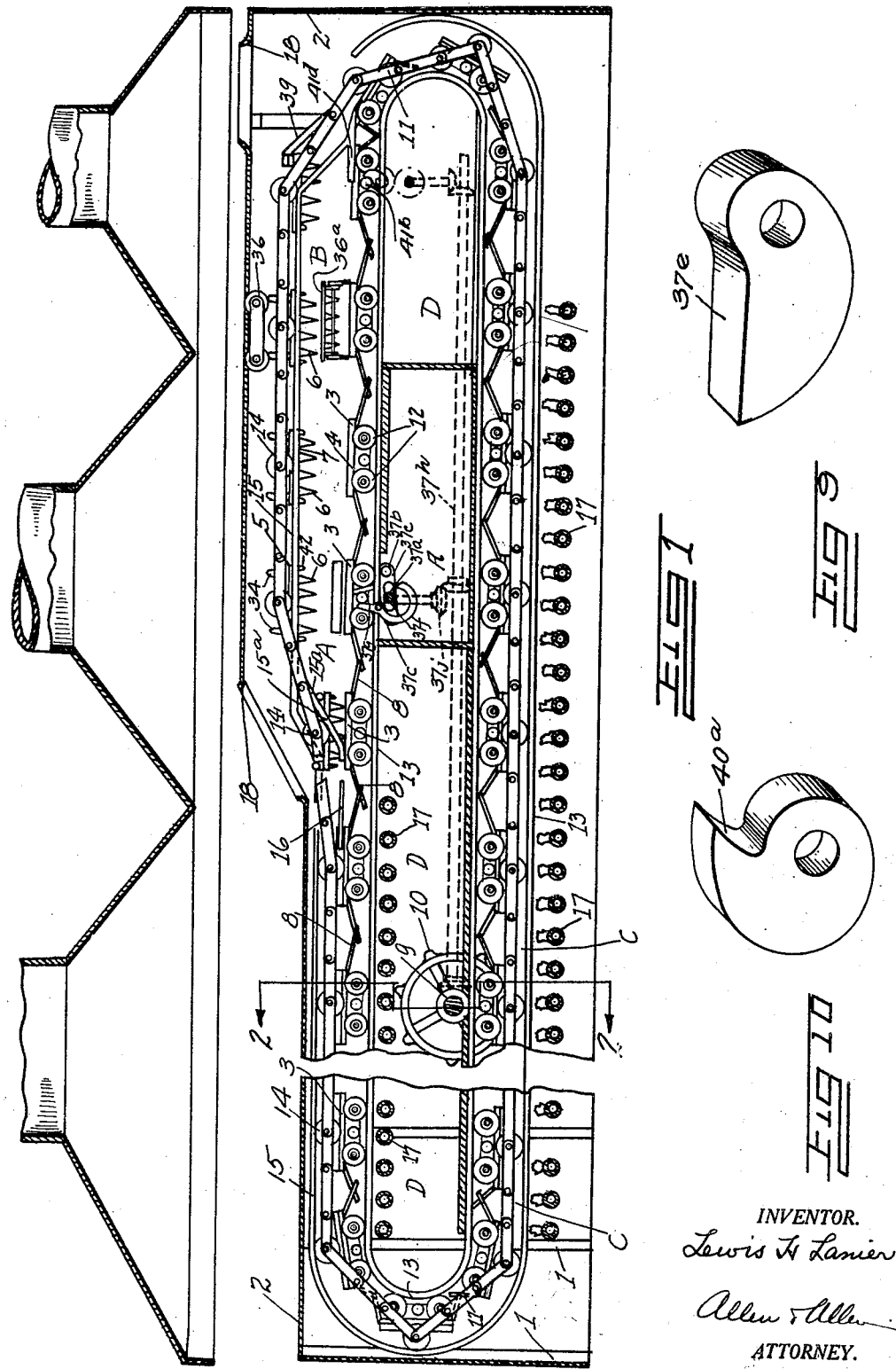

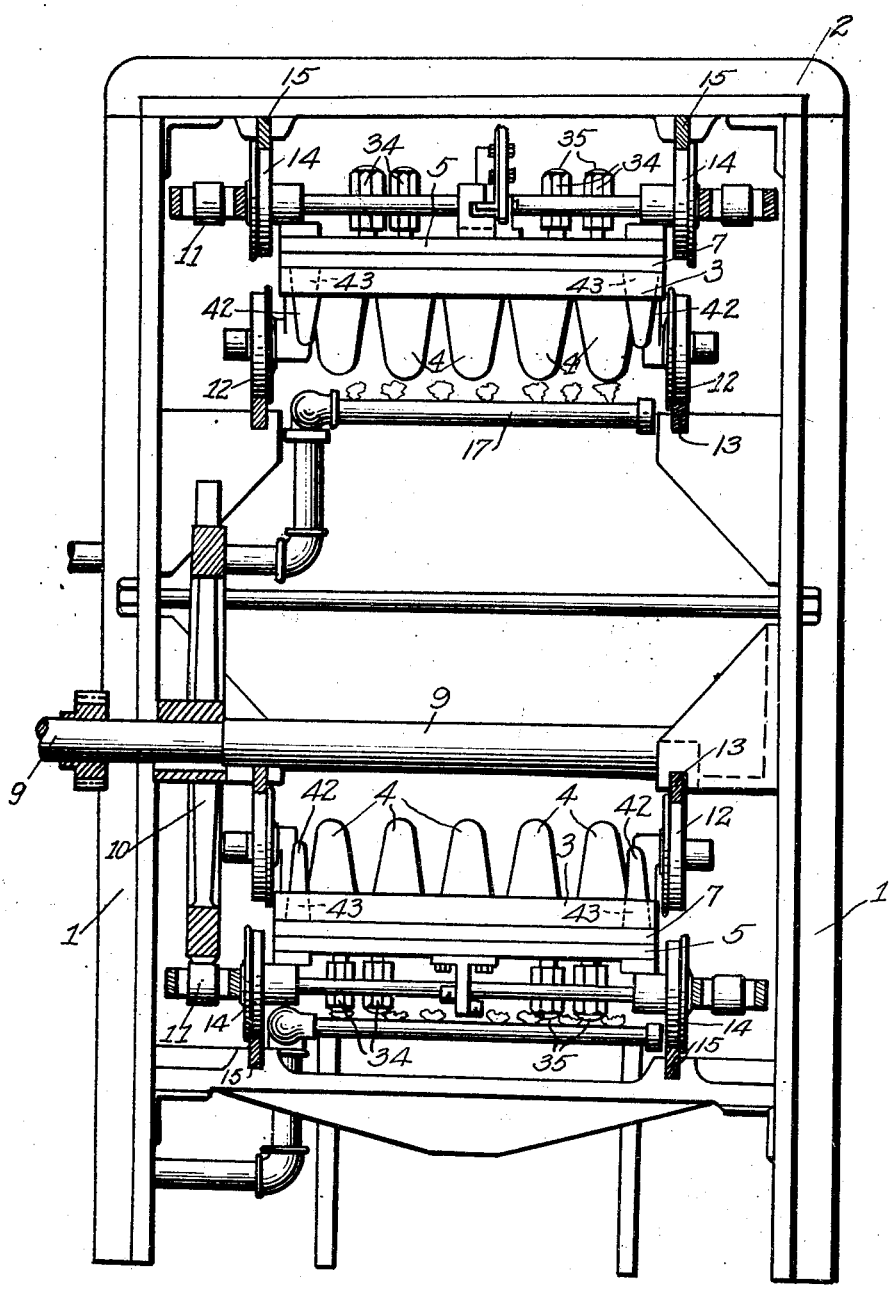

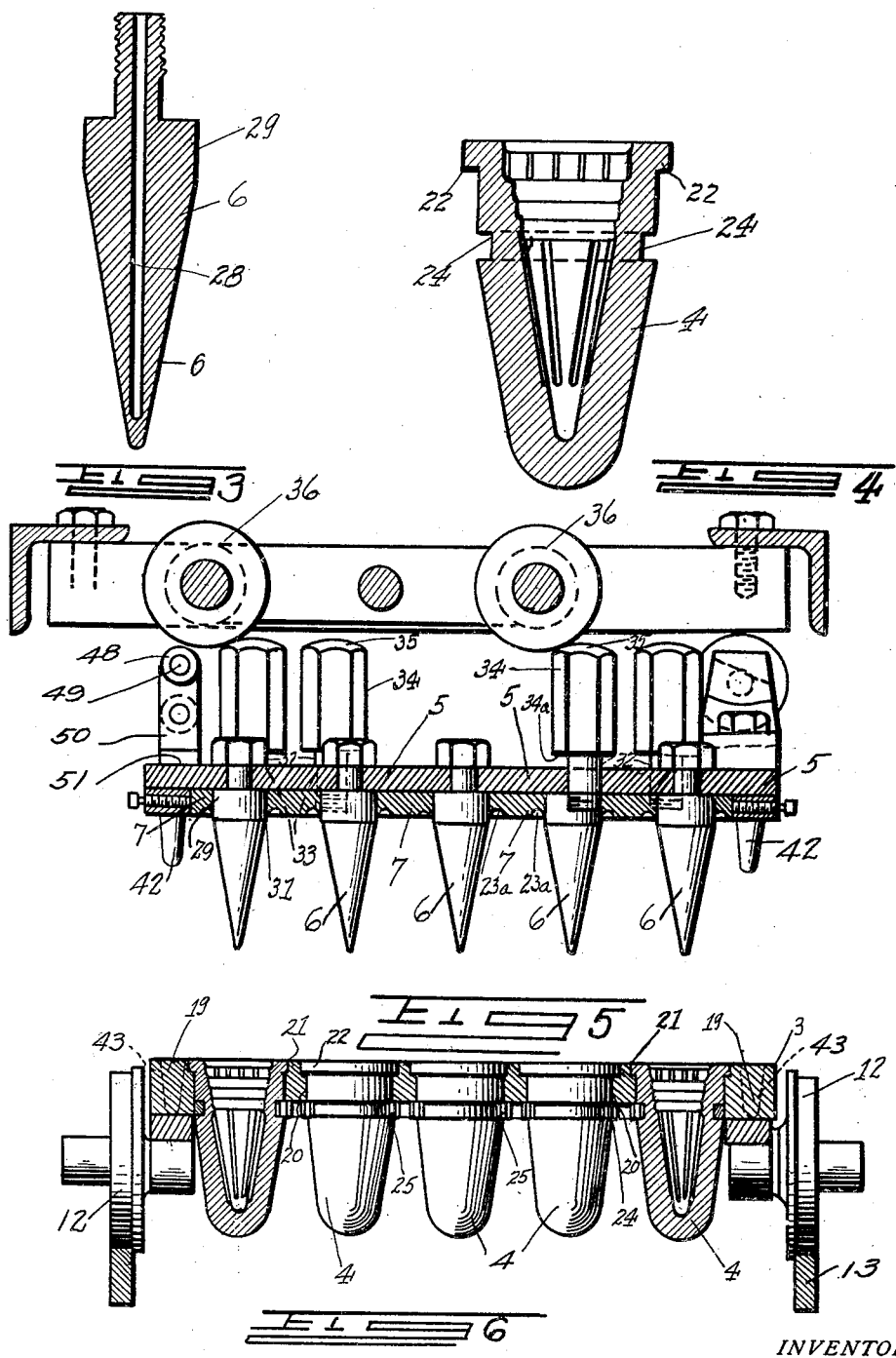

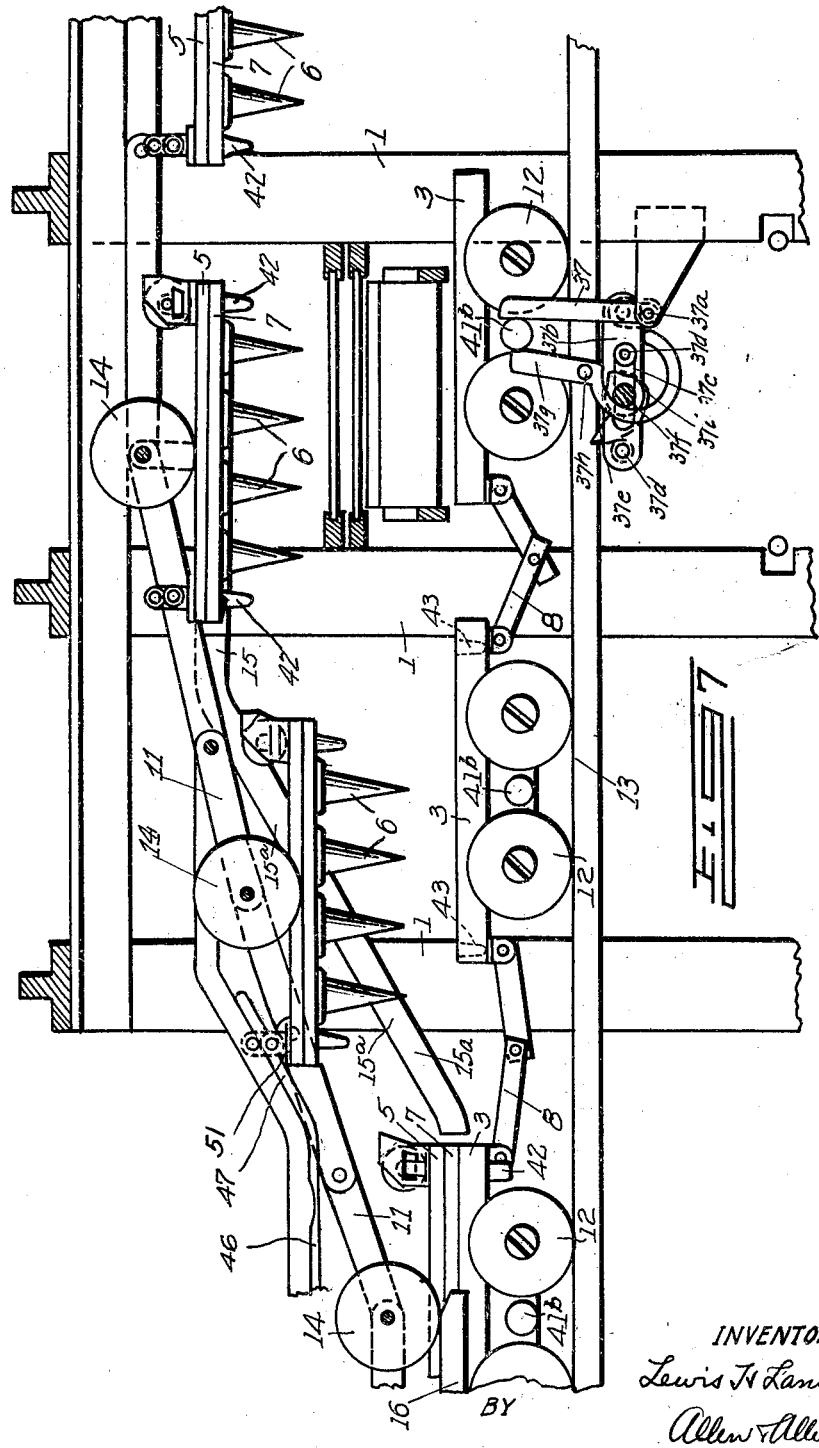

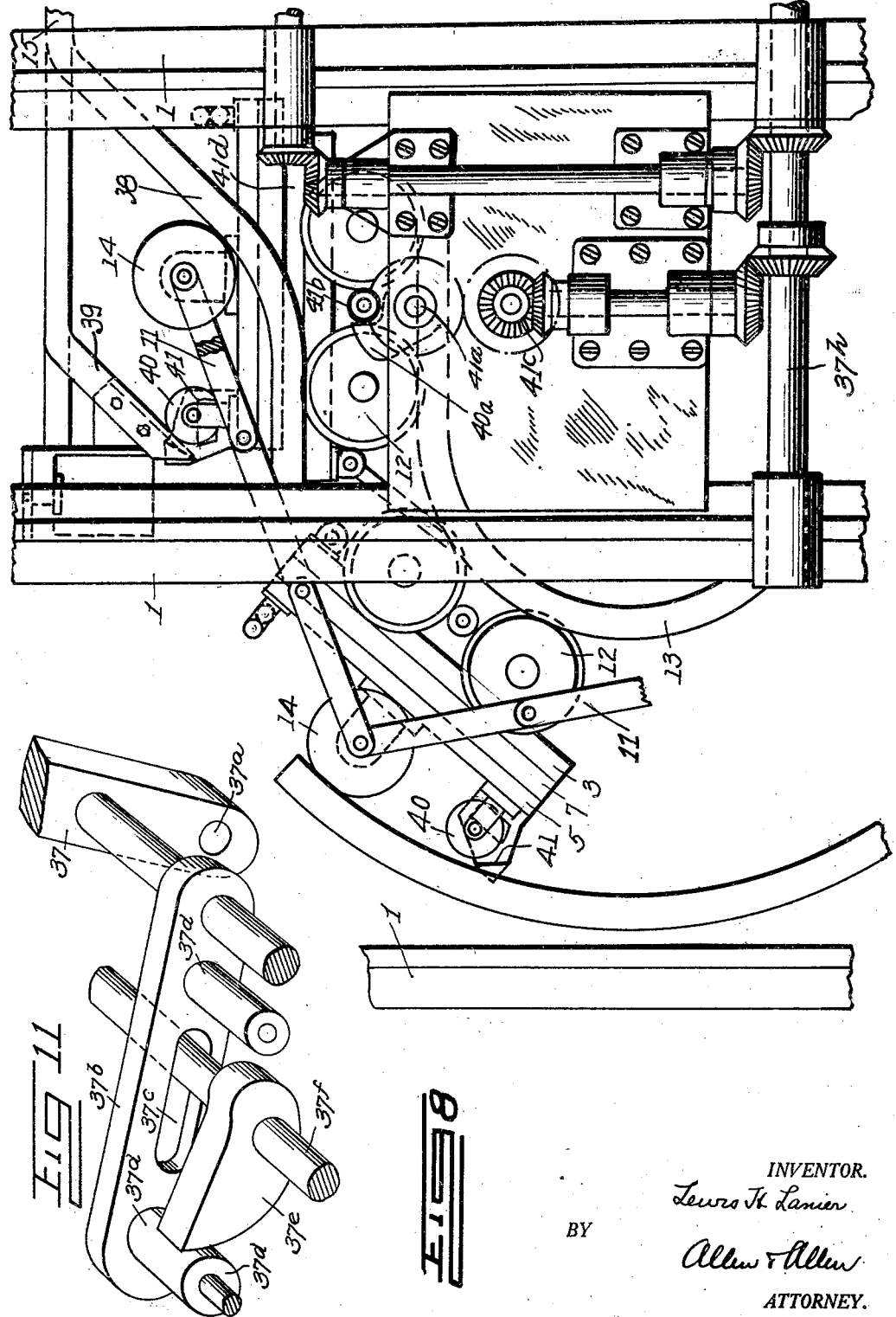

1,823,151

UNITED STATES PATENT OFFICE

LEWIS H. LANIER, OF NEWPORT, KENTUCKY

MACHINE FOR BAKING PASTRY SHELLS

Application filed October 28, 1926. Serial No. 144,831.

My invention relates to machines for baking pastry such as ice cream cones, pastry shells and other articles which are made from various dough mixtures and confections.

It is the object of my invention to provide a machine having a series of plates, each one of which will have extended from the face thereof a series of interspaced molds, and to provide a series of core plates having cores which will fit within the molds and so control the thickness of the pastry shell. In combination with the mold plates and core plates, it is an object of my invention to provide stripper plates which will travel with the core plates. The above noted elements, it is my object to incorporate in an endless conveyor system, and it is a further object of my invention to provide means for regulating the relative movement of the mold plates, stripper plates, and core plates with relation each to the other. It is a still further object to provide interconnecting means between the units consisting of a mold plate, a core plate and a stripper plate, which will affect the relative movement of each unit with relation to another.

The above and other objects, which will be noted at such times during the ensuing disclosure as seems appropriate, I accomplish by that certain construction and arrangement of parts of which the following is a preferred embodiment.

Referring to the drawings:—

Figure 1 is a side elevation with portions of the side covers of the machine removed to reveal the inner structure.

Figure 2 is a lateral vertical section taken along the lines 2—2 in Figure 1.

Figure 3 is an enlarged sectional view of a core member.

Figure 4 is an enlarged sectional view of a mold member.

Figure 5 is a longitudinal vertical section of one unit showing the core plate and stripper plate on an enlarged scale.

Figure 6 is a lateral sectional view of a mold plate.

Figure 7 is an enlarged side elevation of the cam mechanism and mold plate stop in the filling zone.

Figure 8 is an enlarged side elavation of the tracks, guides and accelerating mechanism for separating the mold plates and core plates, shown from the side opposite that shown in Figure 1.

Figure 9 is a perspective of the cam 37e.

Figure 10 is a perspective of the cam 40a.

Figure 11 is a detailed perspective of the cam 37e, rollers 37d and the component working parts.

The whole assembly is best shown in Figure 1, in which frame members 1 are employed as standards to support the machine. A casing 2 or shell preferably of insulating material encloses the frame excepting in that portion of the machine occupied by the feeding mechanism and the delivering mechanism, where for convenience the outer casing may be eliminated. An endless chain conveyor is made up of a series of units consisting of a mold plate 3, having secured thereto and extending inwardly from the upper face thereof a series of interspaced molds 4, a core plate 5, having secured thereto a series of cores 6, which are interspaced in the same arrangement as the molds in the mold plate, and are adapted to extend within the molds during certain portions of the cycle of revolution of each unit, and a stripper plate 7, which travels with the core plate and is adapted to move apart from facial engagement therewith so as to cause pastry shells adhering to the cores to be released therefrom.

Each unit is secured to its adjacent units by scissors links 8, which are pivotally mounted in bosses on the mold plates. The drive for the whole conveying system is shown as provided by a rotatable shaft 9, driven from some convenient source of power, on which is mounted a sprocket wheel 10, the teeth of which engage chain links 11 which extend between the core plates, and are securely attached thereto.

The mold plates have rollers 12, which ride on tracks 13, and the core plates have rollers 14 which ride on tracks 15. The tracks during most of travel of the conveyor are in parallel or concentric alignment. It will be apparent that by changing the angle of inclination of the tracks, and providing guiding means in addition to the rollers on the tracks to control the movement of either the core plates or the mold plates, that relative movement between the core plates and the mold plates of each unit may be accomplished.

The general system of operation of the endless chain conveyor which carries the baking units is as follows. The batter or dough is fed into the molds of each unit as it passes through the filling zone of the machine which is indicated in Figure 1 at A. After a regulated quantity of batter has been deposited in each mold of the mold plate, the tracks 15 on which the core plates are riding are inclined as indicated at 15a, and the core plate and the mold plate comprising the particular unit of which the sequence of operation is being traced, come together with the cores of the core plate extending within the molds of the mold plate so as to regulate the thickness of the pastry shell. By providing an upwardly inclined track for the core plate rollers, as indicated at 16, enough clearance between the lower face of the stripper plate, which is carried with the core plate, and the upper face of the mold plate is provided to allow steam formed within the mold to escape, and thus enable very uniformly shaped cones to be baked. The core plates, stripper plates, and mold plates then come together again and remain together during the balance of their movement until they approach the delivery zone indicated at B, where they separate with the pastry shells adhering to the cores.

The baking is accomplished by suitable heating means such as the gas burners indicated at 17. It is a particular feature of my invention that the source of heat is so arranged with relation to the cooking units, that exceptionally evenly cooked pastry results. It will be observed that the closest exposure of the cooking units to the flame is with the core plates and mold plates in inverted position in the zone indicated at C. The core plates being of lighter construction and having a greater tendency to lose their heat, are subjected to the greatest temperature. The mold plates which retain their heat better during their travel in inverted position through the zone C, are not subjected to as high a temperature as the core plates. The passage of heat from the gas burners is through the oven portion indicated at D, and the primary heating of each unit occurs in upright position with the mold plates subject to the greatest heat in this position, and the core plates not so highly heated. This arrangement which provides for such well balanced heating of the cooking units, which is the equivalent of a double turning of a cooking utensil over a fire is of considerable importance. It will be recalled that in baking waffles, for example, unless the waffle iron is turned at least once during the cooking, the pastry is liable to be too lightly cooked on one side and burned on the other. In a machine such as I have disclosed, the technique of cooking evenly which allows the pastry to be well cooked, and at the same time to be baked so that it has no tendency to stick to the molds, is of considerable importance, and I consider therefore my disclosure which shows an endless carrier conveyor having cooking units carried thereby, with heating means so disposed with relation to the cooking units during certain intervals of their travel, that each element is exposed to heat, first upright and then inverted with the component parts of the cooking units having heat applied in inverse proportion, is of no inconsiderable importance in the art. Flues for the products of combustion may be disposed on the casing as indicated at 18.

Each set or unit consists of a mold plate, a core plate and a stripper plate, and I have found that although variations may be made in the size and general shape of the molds and cores, that the specific types of the elements composing each cooking unit as I have disclosed herein have many advantages. Referring to Figure 6, the mold plate is of simple construction, being composed of a plate 19, having a series of interspaced apertures 20 in it, which have annular grooves 21 at their uppermost end, which seat the annular flanges 22 of the molds 4. Annular grooves 23a are formed in the stripper plate to confine any excess batter which exudes over the surface of the plate 19 while the cores are pressed down into the moulds to distribute the batter equally and form a cone. It must be understood that a certain excess batter is used to form a full cone, and this excess batter will be confined in the annular grooves 23a. Annular grooves 24 sufficiently interspaced from the flanged uppermost ends of the molds to allow the molds to be inserted in the mold plate with their flanges supported on the annular grooves 21 of the apertures, may be used to provide seats for keys 25, which may extend within the grooves 24 and bear against the under side of the mold plate, and thus hold the individual molds within the plates. If there is any failure of correct operation of an individual mold, it may be readily replaced by withdrawing the key and pushing the mold up through the plate where repairs may be made to the mold or a new mold may be inserted in its place. The molds are preferably secured in the mold plate apertures, however, with a driving fit. The core plates are composed of a top plate 5 into which cores 6 are threaded. Each core preferably has an air passage 28 extending from the top down into the conical end. The air passage tends to keep the entire length of the core at an even temperature. The cores have vertical sides 29 at their upper ends, and the type illustrated tapers down in the shape of a cone. They may, however, have other suitable contours to conform to the shape of the molds. The stripper plates 7 have apertures 31 in them interspaced in accordance with the disposition of the molds in the mold plate, and the sides 29 of the cores extend through these apertures. When the pastry shells are in the discharging zone B, the core plates and the stripper plates are separated from the mold plates with the pastry shells adhering to the cores, so that the function of the stripper plate is to move downwardly and push the cones off their respective cores. For regulating the stripping movement of each stripper plate with reference to its core plate, studs 32 are extended through apertures 33 in the core plate. The studs have enlarged heads 34, having flanged lower portions 34a, which bear against the upper side of the core plate thus limiting the movement of the stripper plate. The heads 34 have rounded upper portions 35, which engage rollers 36 supported in the frame of the machine. The rollers are so mounted as to cause the heads 34 to be depressed at the right position to discharge the cones into what I have called a trimmer carrier 36a which forms the subject matter of a separate application.

The trimmer carrier carries away the cones at the correct interval in the cycle of operation, and may also scrape off the top surface of the mold plate.

The filling operation of each mold plate is greatly facilitated if means are provided for speeding up the mold plates during the intervals when they are about to be filled, and then allowing the filling operation to be carried on with the unit at rest. The take-up allowed by the scissors links provides ample clearance for an acceleration in the movement of the mold plates, and in order to speed up the mold plates so that they may come to a stop while being filled, a pusher arm 37 pivoted at 37a is connected with a link 37b, having a slot 37c in it. Two rollers 37d are mounted on the link, and a cam 37e mounted on a rotatable shaft 37f, bears against the rollers and thus moves the grooved link backward and forward, thereby rocking the pusher arm 37. As the pusher arm rocks in a counter clockwise direction it engages a stud 41b extending out from the mold plate, and so accelerates the travel of the mold plate to the filling position. A stop arm 37g, which is pivotally mounted at 37h is locked in position to bear against the stud of the mold plates by a cam 37i, which is also mounted on the shaft 37f which is driven by the gear train 37j from the shaft 37h. By setting the cams properly on the shaft 37f, the movement of the mold plates may be so regulated that each mold plate as it approaches the filling position, is first speeded up and then momentarily stopped while the molds are being filled.

Since the mold plate at core separating position is moved forward by the core plate, and this being the position in which the greatest slack occurs in the mold links, it is evident that the mold must be moved forward by other mechanical movement so as to keep in alignment with the core plate, otherwise the cones would be broken by rubbing against the forward part of the mold. As soon as the core plate is raised sufficiently to withdraw the four dowels or locating pins from the mold, the mold will stand still until the slack ahead has been taken up by the forward movement of the molds. Such separating movement I accomplish by disposing a curved inclined track 38, as indicated in Figure 1, over which the rollers of the core plates ride. Each core plate is limited to a non-tilting travel in this position by an additional track 39, which bears against a guide roller 40 mounted on a bracket 41, which is secured to the core plate.

The mold plates follow around the curve of the track in a regular arc, and are held against raising upward by a track 41d against which the upper sides of the rollers 12 abut. Since the core plates are the means for moving the mold plates and have a greater distance to travel than the mold plates, a pusher arm 40a, mounted on a rotatable shaft 41a, which is driven through the gear train 41c engages a stud 41b extending from the side of each mold plate, continues the movement and accelerates the travel of the mold plate after separation from the core plate.

When the mold plates and the core and stripper plates come together in order to provide means of allowing for wear in the connections and parts of the machine, I have provided finding pins 42 extending from the stripper plates, having smaller diameters than apertures 43 in the mold plates with which the finding pins register. Thus the mold plates and core and stripper plates are brought into exact registry. The finding pins 42, engaging in the apertures 43, provide the normal interengaging means which enables the combined core plate, stripper plate and mold plate of each unit to move as a carriage through the oven under the actuating force of the endless chain links, which join the core plates together.

In order to keep the core plate in a horizontal plane parallel to the mold plates, I have provided a guide track 46 which is bent to form an inclined plane 47 that guides the core plate in the desired manner. This track is engaged by a roller 48 which is rotatively mounted on a stud 49 which is fixed in a bracket 50 rigidly mounted on the top of the core carriage as indicated by 51 in Figure 3.

Modifications in structure in a pastry shell baking machine which will readily occur to others skilled in the art which do not depart from the system of operation outlined herein, I consider within the scope of my invention.

Having thus described my invention, what I claim as new and desire to secure by Letters Patent is:—

1. A pastry shell baking machine comprising a series of interconnected baking units arranged as an endless conveyor, each of said units comprising a member provided with means for molding exterior walls of a plurality of pastry shells baked therein, and said units also comprising a member provided with means for molding interior walls of said shells, and non-extendible means connecting said last named members and extendible means connecting said first named members.

2. A pastry shell baking machine comprising a series of interconnected baking units arranged as an endless conveyor, each of said units comprising a member provided with means for molding exterior walls of a plurality of pastry shells baked therein, and said units also comprising a member provided with means for molding interior walls of said shells, and non-extendible links connecting said last named members, forming elements of said endless conveyor to be driven, and extendible scissors links connecting said first named members.

3. A pastry shell baking machine comprising a series of interconnected baking units arranged as an endless conveyor, each of said units comprising a member provided with means for molding exterior walls of a plurality of pastry shells baked therein, and said units also comprising a member provided with means for molding interior walls of said shells, and non-extendible means connecting said last named members and extendible means connecting said first named members, and means of accelerating the movement of said first named members of each unit during certain portions of the cycle of rotation of said units.

4. A pastry shell baking machine comprising a series of interconnected baking units arranged as an endless conveyor, each of said units comprising a member provided with means for molding exterior walls of a plurality of pastry shells baked therein, and said units also comprising a member provided with means for molding interior walls of said shells, and non-extendible means connecting said last named members and extendible means connecting said first named members, and means of accelerating the movement of said first named members of each unit during certain portions of the cycle of rotation of said units, and means of retarding the movement of said first named member during certain portions of the cycle of rotation of said units.

5. In a machine for baking pastry shells, a series of baking units, composed of a solid mold plate, a stripper plate, and a core plate rotatably supported, said mold plate having interspaced molds for molding the exterior walls of shells, and said core plate having core portions for molding interior walls of said shells extending through said stripper plate, said rotatable supports of said units interconnected as an endless conveyor, said interconnections comprising non-extendible links connecting said core plates.

6. In a machine for baking pastry shells, a series of baking units, composed of a solid mold plate, a stripper plate, and a core plate rotatably supported, said mold plate having interspaced molds for molding the exterior walls of shells, and said core plate having core portions for molding interior walls of said shells extending through said stripper plate, said rotatable supports of said units interconnected as an endless conveyor, said interconnections comprising non-extendible links connecting said core plates, and extendible links connecting said mold plates.

7. In a machine for baking pastry shells, a series of baking units, composed of a solid mold plate, a stripper plate, and a core plate rotatably supported, said mold plate having interspaced molds for molding the exterior walls of shells, and said core plate having core portions for molding interior walls of said shells extending through said stripper plate, said rotatable supports of said units interconnected as an endless conveyor, said interconnections comprising non-extendible links connecting said core plates, and extendible links connecting said mold plates, and means for controlling the speed of movement of said mold plates during certain portions of the cycle of movement of said conveyor.

8. In a machine for baking pastry shells, a series of baking units, composed of a solid mold plate, a stripper plate, and a core plate rotatably supported, said mold plate having interspaced molds for molding the exterior walls of shells, and said core plate having core portions for molding interior walls of said shells extending through said stripper plate, said rotatable supports of said units interconnected as an endless conveyor, said interconnections comprising non-extendible links connecting said core plates, and means for controlling the relative movement of the core plate of each unit with respect to the mold plate of said unit.

9. In a machine for baking pastry shells, a series of baking units, composed of a solid mold plate, a stripper plate, and a core plate rotatably supported, said mold plate having interspaced molds for molding the exterior walls of shells, and said core plate having core portions for molding interior walls of said shells extending through said stripper plate, said rotatable supports of said units interconnected as an endless conveyor, said interconnections comprising non-extendible links connecting said core plates, and means for controlling the relative movement of the core plate of each unit with respect to the mold plate of said unit, and means for controlling the relative movement of the stripper plate of each unit with respect to the core plate of said unit.

10. In a machine for baking pastry shells, a series of baking units, composed of a solid mold plate, a stripper plate, and a core plate rotatably supported, said mold plate having interspaced molds for molding the exterior walls of shells, and said core plate having core portions for molding interior walls of said shells, extending through said stripper plate, said rotatable supports of said units interconnected as an endless conveyor, and said conveyor partially enclosed in a casing provided with heating means, said conveyor having a baking zone, a delivery zone and a filling zone for the baking units, and means of accelerating and retarding the movement of the mold plate of each unit coincidently with the arrival of said mold plate in the filling zone.

11. In a machine for baking pastry shells, a series of baking units, composed of a solid mold plate, a stripper plate, and a core plate rotatably supported, said mold plate having interspaced molds for molding the exterior walls of shells, and said core plate having core portions for molding interior walls of said shells extending through said stripper plate, said rotatable supports of said units interconnected as an endless conveyor, and said conveyor partially enclosed in a casing provided with heating means, said conveyor having a baking zone, a discharging zone and a filling zone for the baking units, and means of separating the core plate and the mold plate of each unit prior to the arrival thereof at the discharging zone, and means affecting the alignment of each core plate with respect to its respective mold plate during the interval of separation of the core plate from its respective mold plate prior to the arrival of the unit at the discharging zone.

12. In a machine for baking pastry shells, a series of baking units, composed of a solid mold plate, a stripper plate, and a core plate rotatably supported, said mold plate having interspaced molds for molding the exterior walls of shells, and said core plate having core portions for molding interior walls of said shells extending through said stripper plate, said rotatable supports of said units interconnected as an endless conveyor, and said conveyor partially enclosed in a casing provided with heating means, said conveyor having a baking zone, a discharging zone and a filling zone for the baking units, and means of separating the core plate and the mold plate of each unit prior to the arrival thereof at the discharging zone, and means of coupling together the core plate and the mold plate of each unit subsequent to the filling of the mold plate of said unit, and means of temporarily uncoupling the core plate and the mold plate of each unit for the release of steam, subsequent to the coupling together of the mold and core plate of each unit.

13. In a machine for baking pastry shells, a series of baking units, composed of a solid mold plate, a stripper plate, and a core plate rotatably supported, said mold plate having interspaced molds for molding the exterior walls of shells, and said core plate having core portions for molding interior walls of said shells extending through said stripper plate, said rotatable supports of said units interconnected as an endless conveyor, and means affected by the movement of said conveyor for controlling the relative position of the core plate of each unit with respect to its respective mold plate.

14. In a machine for baking pastry shells, a series of baking units, composed of a solid mold plate, a stripper plate, and a core plate rotatably supported, said mold plate having interspaced molds for molding the exterior walls of shells, and said core plate having core portions for molding interior walls of said shells extending through said stripper plate, said rotatable supports of said units interconnected as an endless conveyor, and means affected by the movement of said conveyor for controlling the relative position of the core plate of each unit with respect to its respective mold plate, and means affected by the movement of said conveyor for controlling the relative position of each stripper plate with respect to its respective core plate.

15. In a machine for baking pastry shells, a series of baking units, composed of a solid mold plate, a stripper plate, and a core plate rotatably supported, said mold plate having interspaced molds for molding the exterior walls of shells, and said core plate having core portions for molding interior walls of said shells extending through said stripper plate, said rotatable supports of said units interconnected as an endless conveyor, and said conveyor partially enclosed in a casing provided with heating means, said conveyor having a baking zone, a discharging zone and a filling zone for the baking units, and means of separating the core plate and the mold plate of each unit prior to the arrival thereof at the discharging zone, said separating means affected by the movement of said conveyor.

16. In a machine for baking pastry shells, a series of baking units, composed of a solid mold plate, a stripper plate, and a core plate rotatably supported, said mold plate having interspaced molds for molding the exterior walls of shells, and said core plate having core portions for molding interior walls of said shells extending through said stripper plate, said rotatable supports of said units interconnected as an endless conveyor, and said conveyor partially enclosed in a casing provided with heating means, said conveyor having a baking zone, a discharging zone and a filling zone for the baking units, and means of separating the core plate and guiding the mold plate for each unit prior to the arrival thereof at the discharging zone, and interconnecting means affecting the alignment of each core plate with respect to its respective mold plate during the interval of separation of the core plate from its respective mold plate prior to the arrival of the unit at the discharging zone, and independently operable accelerating means affecting the alignment of each mold plate with respect to its cooperating core plate during the separating interval.

17. A baking machine for pastry shells having a series of baking units composed of mold plates and core plates, each unit being movable through an elliptical path during which each unit is moved throughout the length of the machine in inverted position and then throughout the length of the machine in upright position, said core plates of the series of units being connected together as a non-extendible endless chain, said mold plates of each unit being connected together as an extendible endless chain, means for driving the endless chain composed of core plates, said endless chain composed of core plates providing means for moving the endless chain composed of mold plates.

LEWIS H. LANIER.